US005195925A

United States Patent [19]

Gorans

[11] Patent Number: 5,195,925

[45] Date of Patent: Mar. 23, 1993

[54] METHOD AND APPARATUS FOR DECLAWING POULTRY

[75] Inventor: Marc S. Gorans, Willmar, Minn.

[73] Assignee: Nova-Tech Engineering, Inc., Willmar, Minn.

[21] Appl. No.: 648,531

[22] Filed: Jan. 30, 1991

[51] Int. Cl.[5] .......... A22C 21/00

[52] U.S. Cl. .......... 452/166; 452/167

[58] Field of Search .......... 452/166, 167, 171, 198, 452/53

[56] References Cited

U.S. PATENT DOCUMENTS

| | | | |
|---|---|---|---|
| 2,731,664 | 1/1956 | Osborne | 452/166 |
| 2,836,845 | 6/1958 | Farchmin et al. | 452/166 |
| 3,548,448 | 12/1970 | Vertegaal | 452/167 |
| 3,833,966 | 9/1974 | Harben, Jr. | 452/53 |
| 4,215,654 | 8/1980 | Parker, Jr. | 452/53 |
| 4,457,048 | 7/1984 | Dreves | 452/166 |

FOREIGN PATENT DOCUMENTS

| | | | |
|---|---|---|---|
| 741838 | 6/1980 | U.S.S.R. | 452/166 |

OTHER PUBLICATIONS

Fundamentals of Electronics: Microwave Circuit Applications, Bureau of Naval Personnel, Document NAVPERS 93400-6, Chapter 52, Waveguides and Cavities, pp. 49-63, Jul., 1964.

Waveguides Handbook, authored by N. Marcuvitz, publ. by Peter Peregrinus, Ltd., London, 1986.

Industrial Microwave Heating, authored by A. C. Metaxas and R. J. Meredith, published by Peter Peregrinus, Ltd., London, pp. 1-7, 20-23, 26-27, 32-33, 104-109, and portions of chapter 7.

Avion Anatomy Integument, part 1 and 2, Agricultural Handbook #362, Agricultural Research Service, USDA in cooperation with Michigan Agricultural Experimental Station, portions of chapter 9—Microscopic Structure of Skin and Derivatives, U.S. Printing Office, 1972.

An unidentified 2 page excerpt relating to transmission-line modes and rectangular waveguides.

An unidentified 15 page excerpt entitled "Chapter 52: Waveguides and Cavities."

An unidentified 15 page excerpt apparently authored by A. C. Metaxas and R. J. Meredith relating to microwave heating and containing chapters relating to dielectric loss, dielectric properties, travelling wave applicators, and single mode resonant cavities.

An unidentified 5 page excerpt relating to the digital claw and entitled "Chapter 9—Microscopic Structure of Skin and Derivities".

*Primary Examiner*—Willis Little

*Attorney, Agent, or Firm*—Palmatier, Sjoquist & Helget

[57] ABSTRACT

A method of declawing poultry by applying a form of heat to the claws of a one-day old poult. The preferred form of heat is microwave energy, which is applied for one-half second. After such a bloodless and relatively painless treatment, the claws fall off in one to three weeks. Declawing apparatus including a magnetron supplying microwave energy into a waveguide into which a poult's toes are inserted by conveyer which carries the poult in inverted position by shackles from which the poult is suspended in inverted position.

49 Claims, 9 Drawing Sheets

METHOD AND APPARATUS FOR DECLAWING POULTRY

BACKGROUND OF THE INVENTION

The present invention relates to declawing turkey poults and chick poults through a form of heat such as microwave energy.

The claw of the poultry is a weapon for fighting and scratching other poultry. In commercial production of poultry, such fighting and scratching may result in a disfigurement of the poultry and reduce its market value. Accordingly, poultry are de-toed to eliminate the claw.

Previously, poultry have been de-toed by cutting through the toe with a red hot blade to cauterize the toe. Although bleeding may be minimized by cauterization, the wound resulting from this process still produces a substantial amount of pain and may induce shock in the poultry, causing the poults to be measurably set back in their growth.

In using this prior art process, approximately one-third of the toe of the poultry is cut off to eliminate the claw. For example, in a turkey, a toe consists of five bones or phalanges, and the cut in the de-toeing process is made in the middle of the fourth phalanx. The claw of the turkey toe extends from the fifth phalanx.

SUMMARY OF THE INVENTION

A feature of the present invention is the provision in a method of processing live poults, of heating a portion of a toe of a poult to kill the germinal bed tissue from which the claw grows to rid the toe of the claw.

Another feature is the provision in such a method of processing live poults, of exposing the poultry claw to microwave energy.

Another feature is the provision in such a method of processing live poults, of exposing the poultry claw to ultrasound energy.

Another feature is the provision in such a method of processing live poults, of exposing the poultry claw to electrical energy in the form of electrical resistance heating.

Another feature is the provision in a method of processing live poults, of declawing a poult instead of de-toeing a poult.

Another feature is the provision in an apparatus for applying microwave energy onto a portion of a toe of a live poult, of a waveguide having a chamber into which microwave energy is emanated and which includes a wall portion with a plurality of apertures through which portions of jointed poultry toes may extend for locating the claws of the poultry.

Another feature is the provision in such an apparatus for applying microwave energy onto a portion of a jointed toe of a live poult, of grasping means for suspending a poult in an inverted position from its legs to secure the poult.

Another feature is the provision in a method of processing live poults, f suspending a poult from its legs in an inverted position with the head of the poult hanging downward to render the poult docile.

An advantage of the present invention is that it provides a more humane method for removing claws from poultry. The declawing method is bloodless and induces little or no shock in the poultry.

Another advantage is that a poult retains a greater portion of each of its toes. With the prior art conventional method of de-toeing, each of the toes is cut at the middle of its fourth phalange such that approximately one-third of each of its toes is removed. With the method of the present invention, no portion of the toe is removed during the process, and there is no open wound because the claws remain on the toes for one to two weeks until the claws simply fall off.

Another advantage is that the gait of the poultry remains natural after the declawing process. In contrast, a turkey that has been de-toed walks and runs in an unnatural fashion and may have difficulty maintaining its balance when standing.

Another advantage is that the process is sanitary. Unlike conventional de-toeing methods which produce buildups of tissue and blood, the present process produces no such buildup and hence attracts none of the attendant flies and bacteria.

Another advantage is that the time of processing poultry is decreased. One poult is handled for less than three seconds, and the claws of the poult are exposed to microwave energy for only approximately one-half second.

DETAILED DESCRIPTION OF THE PREFERRED EMBODIMENTS

Figure 1:
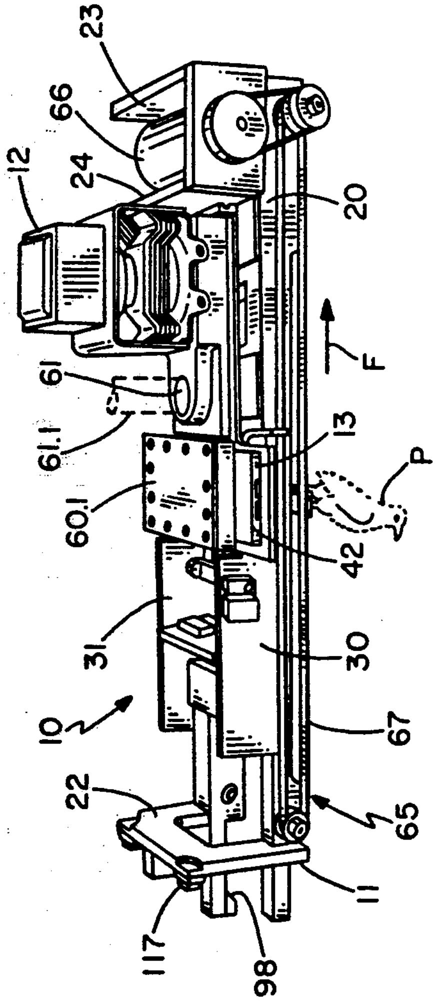
FIG. 1 is a perspective view of a microwave apparatus for declawing poultry with a poult suspended from the apparatus.

As shown in FIG. 1, a microwave apparatus for declawing poultry is indicated in general by the reference numeral 10. In includes as its principal components a frame assembly 11 mounting a magnetron 12 and a waveguide 13 for receiving toe portions of a poult 14. A one-half second exposure of a portion of each of the toes of the poult 14 to microwave energy generated by the magnetron 12 and transferred by the waveguide 13 to the toe portions of the poult 14 kills all or most of the germinal bed tissue from which the claws grow. The claws then simply fall off within one to three weeks.

Figure 8:
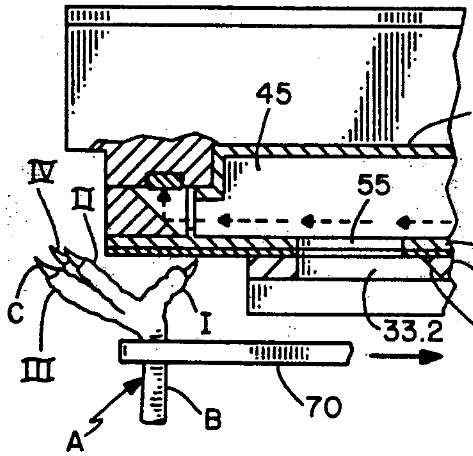
FIG. 8 is a detail section view of the waveguide taken generally at 8—8 of FIG. 3 with the shackles carrying the poult's foot and approaching the waveguide.

A one-day old poult has feet which are rather well developed and which closely resemble the feet of mature turkeys As shown in FIG. 8, a leg portion A of a one-day old poult includes a shank portion B and four digits or toes commonly referred to by Roman numerals as digit I, digit II, digit III, and digit IV. Each of the digits of the one-day old poult has a distinct claw C. A sectional detail view of a claw and portion of a digit of an untreated one-day old poult is shown in FIG. 20.

Figure 20:
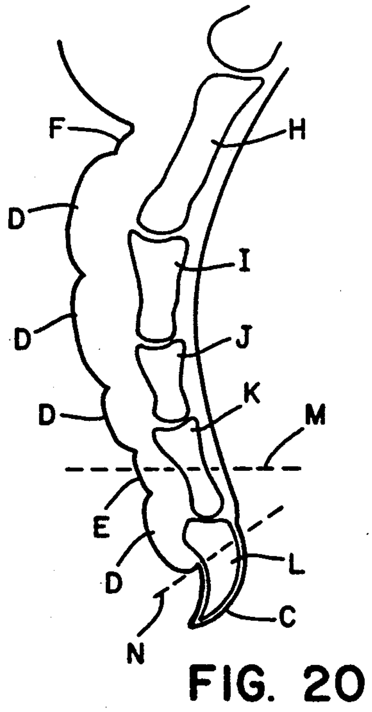
FIG. 20 a schematic illustration of the fourth digit of a of a mature turkey.
Figure 21:
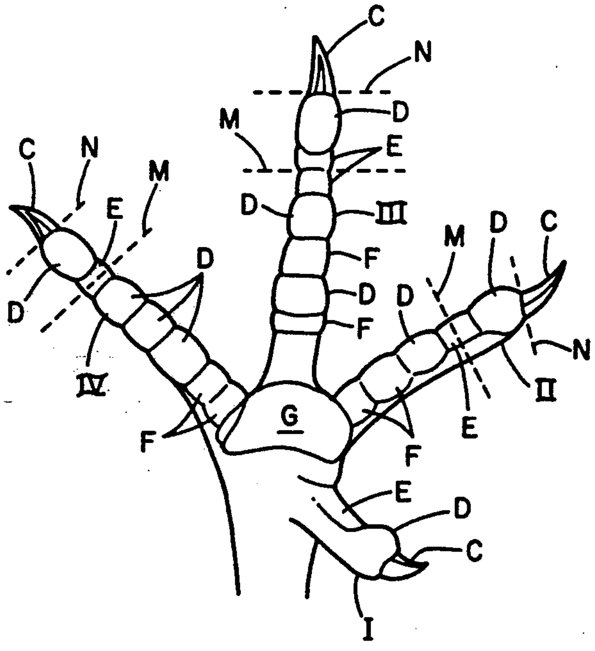
FIG. 21 is a diagrammatic bottom view of the digits of a mature chicken, which are substantially identical to the digits of a turkey.

As shown in FIGS. 20 and 21, the three digits II, III, and IV of mature turkeys and chickens include fully developed claws C, a number of digital pads D, interpad spaces E, F, and a metatarsal pad G. The digits II, III, IV include the five bones or phalanges H, I, J, K, and L. The fifth bone or phalange L forms the claw C.

The prior art method of cutting the digits II, III, and IV with a hot blade severs such digits at line M, which extends centrally through interpad space E and the fourth phalange or bone K. Hence the prior art method detoes instead of merely declawing; as well as removing the claw C, the prior art cutting methods generally removes the entire fifth bone, L, one-half of the fourth bone K and the entire distal digital pad D of each of the digits II, III, and IV.

Digit I, referred to as the fighting digit or claw of the turkey or chicken, is typically not severed. However, it is becoming increasingly popular to detoe the fighting digit I. When so desired, in the prior art digit I has been severed at interpad space E.

With the present method of heating the toes of a poult, claw C simply falls off one to three weeks after treatment, leaving a portion of the fifth bone L and the entire distal digital pad D.

According to the present invention, live poults are processed soon after hatching to effectively declaw the poults. The processing involves treating the toes of the poult to kill or inhibit growth of the germinal bed tissue, or at least a portion thereof, in the toes of the poult, as to inhibit growth of the claws from the toes and induce deterioration of at least portions of the toes, whereby the claws will simply fall off after one to three weeks as the active poult walks around in a normal manner. The treating of the toes involves exposing portions of the toes to a reactive environment, i.e. microwave energy, which embraces the toes and penetrates the toes and into the germinal bed tissue for heating the tissue and claws to kill all or at least some of such tissue. In some cases, if the entire germinal bed tissue, from which the claw grows, is not killed, growth of the claw is inhibited and the claw will fall off, but a deformed claw may grow back, small in size and of rounded shape as to be ineffective for fighting purposes. In most cases, the tissue and claw will deteriorate so as to effectively declaw the toe. The microwave energy causes heating of the claw and germinal bed tissue which heating produces the deterioration of the claw and the inhibiting of growth in the germinal bed tissue and claw. During the exposing of the end portions of the toes and the claws to the microwave energy, other portions of the toes are shielded from the microwave energy to prevent any injurious effect upon such other portions of the toes.

Other treatments of the toes to produce such declawing include heating the toes with electric resistance heating, ultra sound wave heating.

It has been found that a poult can be easily treated if the poult is inverted, as to hang its head down with its feet and legs extending upward during treatment. The poults legs may be fastened into shackles for this purpose.

With reference to the microwave declawing apparatus 10, and especially FIGS. 1-5, the frame assembly 11 includes two elongate frame metal bars 20, 21, in spaced and rigid parallel relationship to each other. The frame includes front and rear U-shaped upright header plates 22, 23, another upright header plate 24, a lower horizontal transverse plate 25 beneath the bars 20, 21, and upper horizontal plates 26, 27, and are all affixed to bars 20, 21 as by screws. The plate 27 has release cams 120 formed integrally thereof as hereinafter described.

Figure 12:
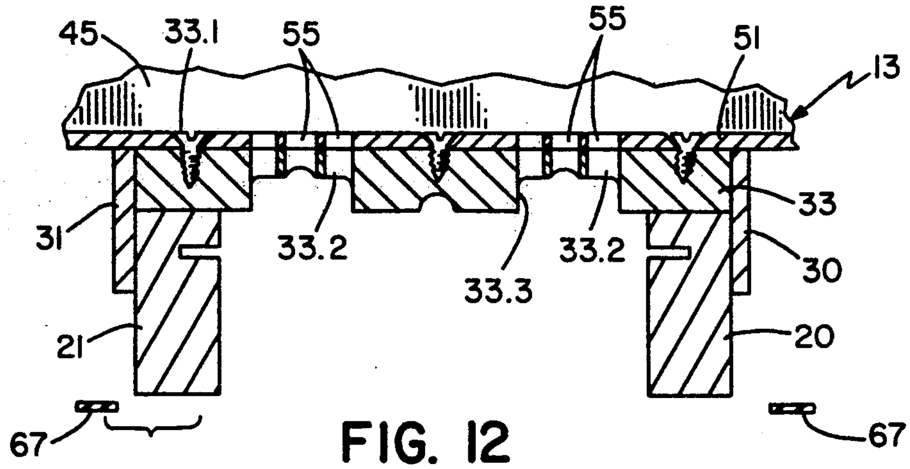
FIG. 12 is an enlarged detail section view taken approximately at 12—12 of FIG. 3.
Figure 13:
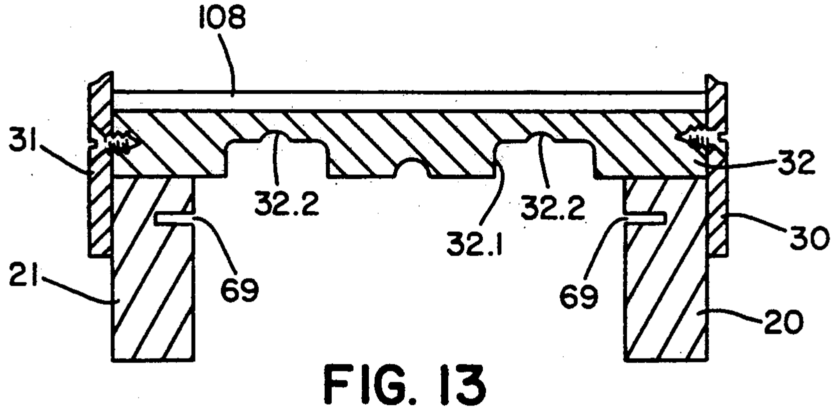
FIG. 13 is an enlarged detail section view taken approximately at 13—13 of FIG. 3.

The frame assembly 11 further includes upright side plates 30, 31 affixed to bars 20, 21. The side plates 30, 31 serve as mounts for grooved toe sensing block 32 and an apertured grooved toe locating block 33. These blocks 32, 33 (also seen in FIGS. 12, 13) overlie and are stationary with respect to the frame bars 20, 21 to participate in the rigid frame assembly 11 for mounting the massive magnetron 12 and waveguide 13.

Plate 32 has a pair of generally rectangular grooves 32.1 in its bottom side to guide the foot and toes of the poult as the foot is moved longitudinally toward the waveguide 13 as hereinafter more fully described. The plate 32 also has a pair of small grooves 32.2 formed in the bottom of the grooves 32.1 for specifically guiding the center toe or digit III, thereby assisting the proper orientation of the foot and toe during the movement of the toes along the machine.

Similarly, the plate 33 has a pair of elongate grooves 33.3 formed in the bottom side thereof to guide the foot and toes of the poult and to also receive the ends of closure plates 62 which partially close apertures 55, 33.2 after the poult's toes are inserted therein, and also serve to properly position and retain the toes in said apertures.

The front end of the waveguide 13 is entirely supported on and is affixed to the toe block 33 as by screws 33.1, and waveguide 13 also bears on side plates 30, 31. The rear end of waveguide 13 mounts the magnetron 12 via bolts 34. It should be not ed that both the magnetron 12 and waveguide 13 are spaced from upright plate 24 and from frame bars 20, 21.

The magnetron 12 utilized is the Hitachi model number 2M107A which is operated to generate microwaves with a frequency of 2.54 GHz at 800 watts. Other magnetrons may be used for generating microwave frequencies from approximately 400 MHz to 3000 MHz. The magnetron includes an electrical plug 36 for receiving power from an outside source and an antennae 37, which depends through an aperture 38 formed in the waveguide 13.

The waveguide 13 is disposed between the magnetron 12 and toe block 33 to transfer microwave energy from the antennae 37 of the magnetron 12 to the toe portions of the poult 14 protruding through the toe block 33 and into the interior of the waveguide.

The waveguide 13 may be brass, aluminum or stainless steel, but brass is preferred, and includes three box-like portions 40, 41, 42 which traverse the frame bars 20, 21, and portions 40, 41 are spaced above and are free of the frame bars 20, 21. The three box-like portions 40, 41, 42 define three respective waveguide chambers or cavities 43, 44, 45 (see FIG. 10). Waveguide cavity 43 is defined by upper and lower panels 46, 47 of box-like portion 40. Waveguide cavity 44 is defined by upper and lower panels 48, 49 of box-like portion 41. Waveguide cavity 45 is defined by upper and lower panels or walls 50, 51 of box-like portion 42, and cover 60.1 which closes the opening 60 in panel 50.

The distance between the upper and lower panels 46-51 forming the waveguide cavities 43-45 decreases from cavity 43 to cavity 45 to increase the amount of heat or voltage gradient delivered to the toe portions of the poult 14 which protrude into cavity 45. The distance between the panels 46, 47 of the first portion 40 is approximately twice the distance between plates 48, 49 of the second portion 41 such that the heat or voltage gradient in the second portion 41 is approximately twice that in the first portion 40. The distance between plates 48, 49 is approximately twice the distance between plates 50, 51 of the third box-like portion 42 such that the heat or voltage gradient in the third portion 42 is twice that in the second portion 41. Box-like portions 41, 42 may be referred to as step down portions.

The transverse box-like portion 42 of the waveguide 13 is elongate in a direction transversely of the frame bars to increase the distance the microwave wavelength travels before reflection. Such an elongate feature "spreads out" the microwave wavelength to heat the toe portions of the poult more evenly or uniformly.

The panel 51 of the waveguide 13 overlies and is affixed to the transverse mounting and toe locating plate of block 33 as by screws 33.1. A set of elongate slot-like apertures 55 through panel 51 are shaped for receiving the claws and corresponding toe portions of an inverted poult 14. Apertures 33.2 in plate 33 are aligned with the apertures 55 in the panel 51 and are arranged in the same pattern for receiving the toes and claws of the poult. The apertures 55, 33.2 are arranged in two sets of three with each of the sets receiving three of the four toes of one of the legs of a poult, i.e., digits II, III and IV of the poult's foot. The apertures 55 are staggered within each of the sets to receive the toes in their natural staggered positions. The elongate shape accommodates easy insertion of a toe, and allows the toe to be bent or tilted through the aperture when the toe is properly positioned. The width of each aperture approximates the thickness of the poult's toe so that the toe nearly fills the width of the aperture.

The upper panel 50 of the waveguide 13 includes a rectangular opening 60 such that the apertures 55 are accessible and visible when the cover 60.1 is removed. When the apparatus 10 is in operation, a cover plate 60.1 is affixed by screws to the upper panel 50 to form a portion of panel 50 and to seal the rectangular opening 60. The main purpose of the rectangular opening 60 is to permit observing, in test runs before energizing the magnetron, that the the toes of a poult are being inserted into slots 55 properly. Although shown with the rectangular opening 60, the box-like portion 42 and the opening may be eliminated so that the entire waveguide 13 may be of a one-piece construction.

A vacuum port 61 is formed in the upper panel 48 of waveguide 13. Vacuum is applied from a source of vacuum pressure by a hose or duct 61.1 to the port 61 to the waveguide cavities 43, 44, 45 to draw the toe portions of the poult into the cavity 45 through toe apertures 55. Such vacuum facilitates not only initiate entry of the toe portions into the apertures 55 but a substantially complete insertion of the desired portions of the toes into the cavity 45. Port 61 is traversed by an apertured plate 61.2 affixed to plate 48 such that microwave energy does not escape through the port 61.

A conveyer means, indicated in general by numeral 65, is provided for carrying the poult P in inverted position, suspending the poult from its legs and delivering the poult to the waveguide 13 at which the treatment of the toes is performed for declawing the poult. The conveyer means has several principal components, including the motor 66 and its speed reducing pulleys; drive belts 67 on both sides of the frame; a slide 68 connected to the drive belt 67 and moved thereby; the slide being movable in tracks or grooves 69 in the frame bars 20, 21; and the slide 68 carries shackles 70 for grasping the legs of the poult and carrying the poult along with movement of the slide 68.

Figure 3:
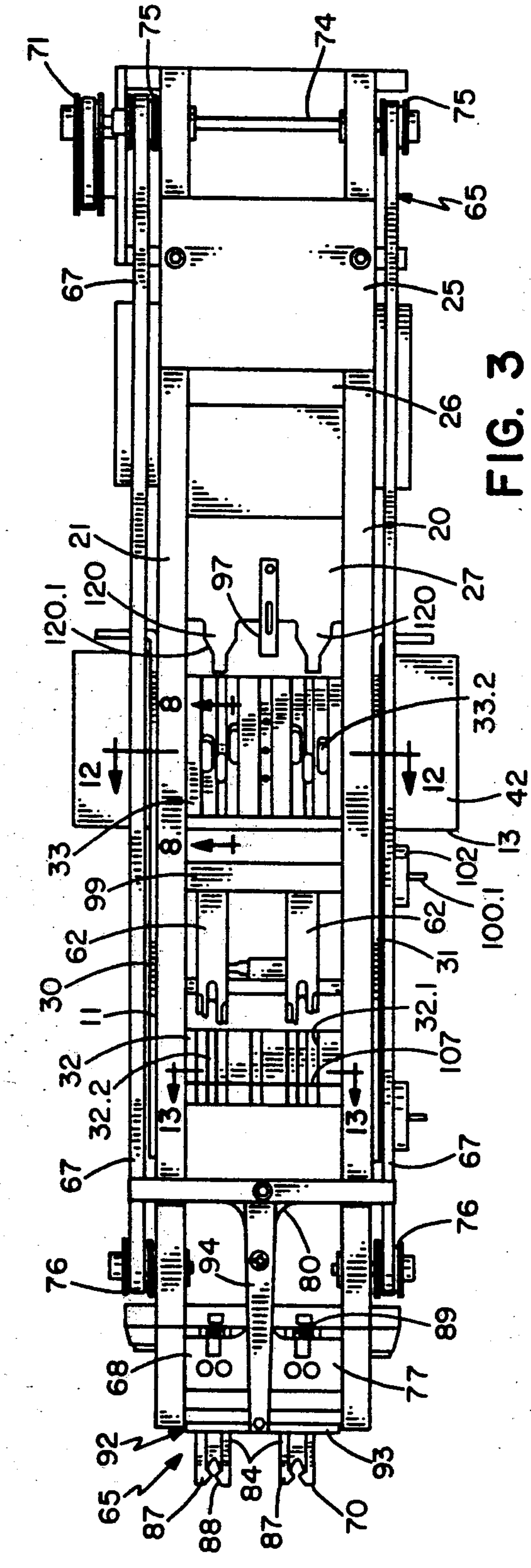
FIG. 3 is a bottom plan view of the apparatus of FIG. 1.
Figure 4:
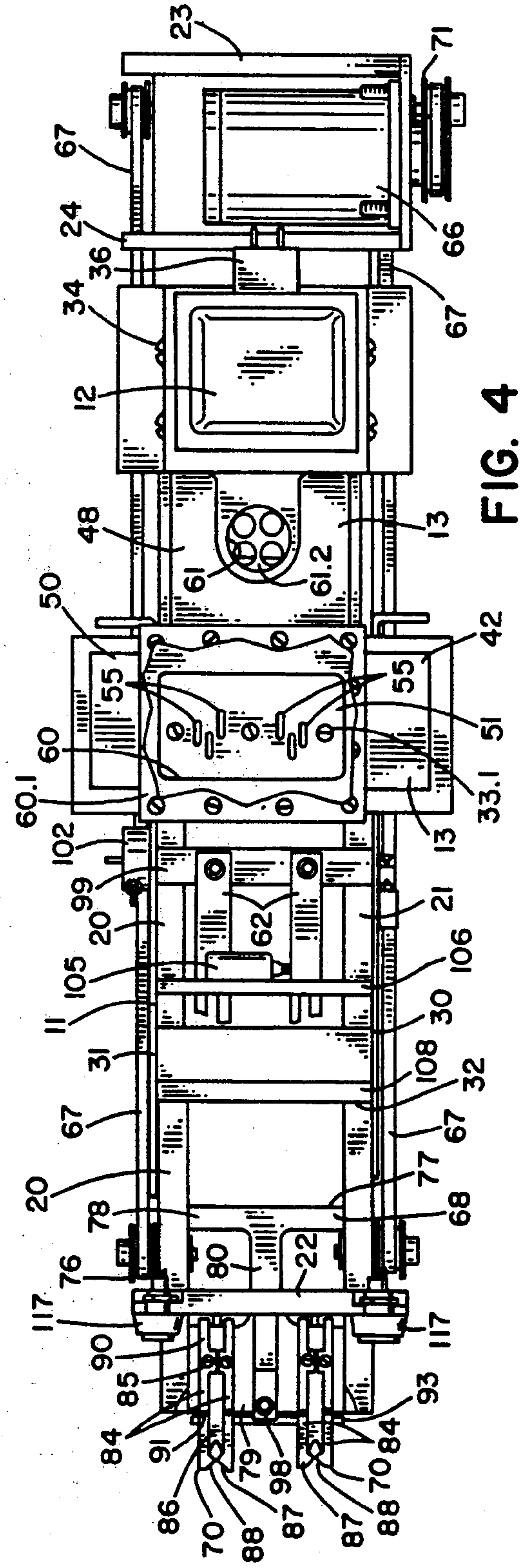
FIG. 4 is a top plan view of the apparatus of FIG. 1.

The motor 66 is preferably a stepping motor as to be able to turn precisely under control so that the position of conveyor belt 67 and slide 68 may be determined by the control mechanism. Motor 66 has a large pulley 71 on its shaft which drives a belt 72 which is trained over a smaller pulley 73 on the drive shaft 74 carried by the frame bars 20, 21. Additional drive pulleys 75 on the drive shaft 74 drive the belts 67 which are also trained around idler pulleys 76. It will be recognized that the drive belts 67 extend the full length of the frame. The motor 66 is reversible so that the drive belt 67 may move forwardly in the direction of arrow F to deliver the poult to the waveguide 13; and the motor may be then reversed to return the slide 68 to the front end of the machine as illustrated in FIGS. 3 and 4.

The slide 68 has a main slide frame plate 77 which is generally H-shaped and has a forward transverse guide portion 78 and a rear transverse mounting portion 79, both of which protrude into the grooves or tracks 69 of the frame bars 20, 21 for sliding along the frame bars. The mounting portion 79 and the guide portion 78 are interconnected by a stem portion 80 which maintains the two end portions 78, 79 rigid with respect to each other.

A pair of clamping bars 81, 82 form a part of the slide 68 and clamp the drive belts 67 therebetween for securing the slide 68 to the drive belt. The clamp bars 81, 82 are affixed as by screws to a post or block 83 which depends from and is affixed to the guide portion 78 of the slide.

The shackles 70 are mounted on and protrude endways from the mounting portion 79 of the slide plate 77.

Figure 6:
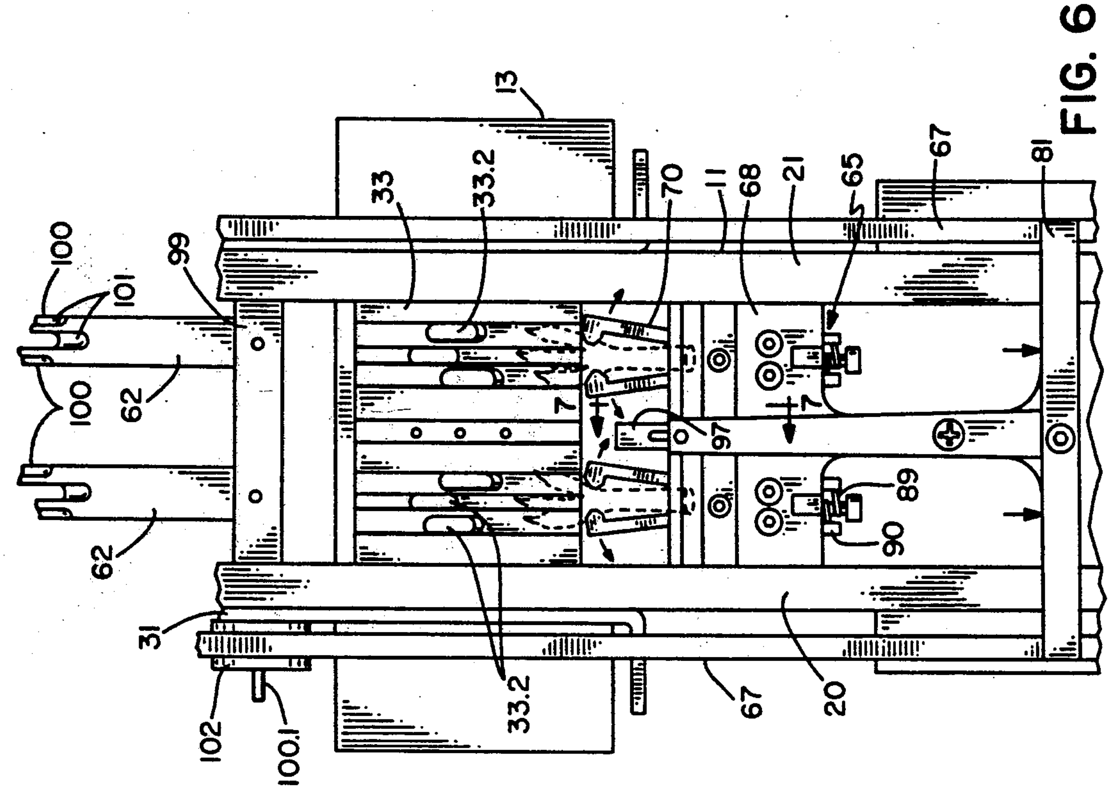
FIG. 6 is an enlarged detail bottom plan view of the apparatus of FIG. 1 showing shackles opening to release the toes of a poult which are shown in phantom.
Figure 5:
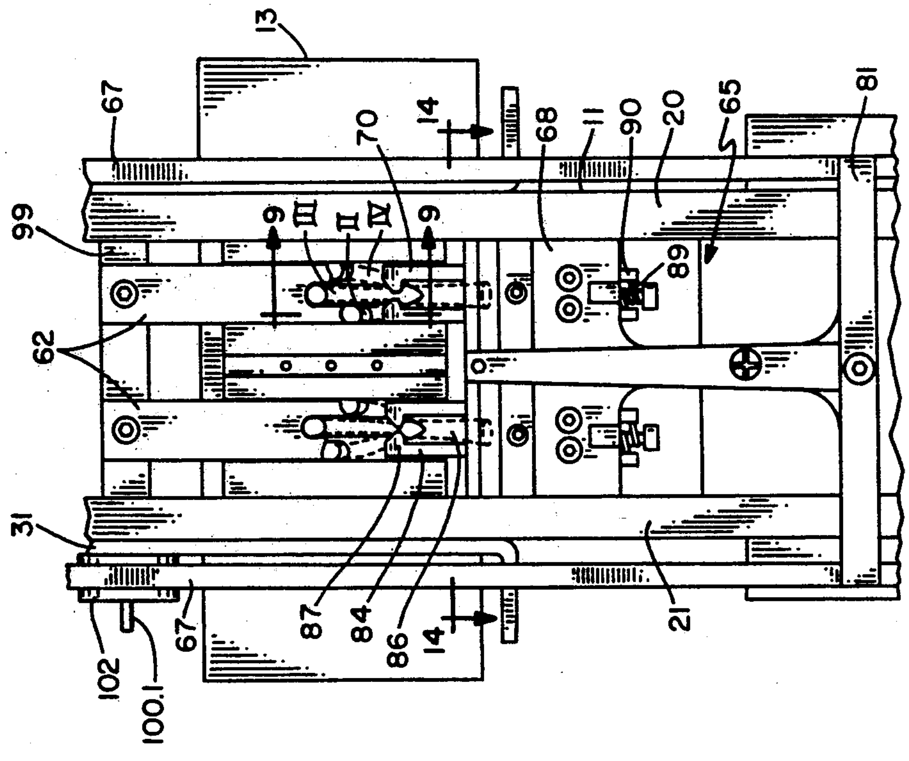
FIG. 5 is an enlarged detail bottom plan view of the apparatus of FIG. 1 showing the toes of a poult in position to be treated.
Figure 7:
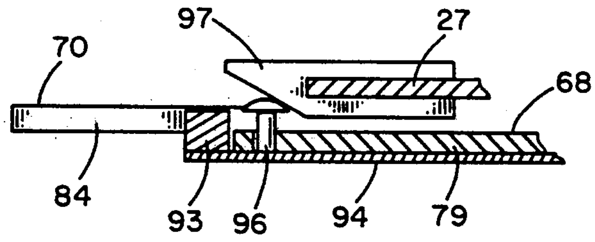
FIG. 7 is a detail section view at lines 7—7 of FIG. 6.

Each of the shackles 70 has a pair of swingable or pivotal jaw arms 84, each of which is mounted on a pivot pin 85 affixed on the mounting portion 79 of the slide plate 77. Each of the shackles 70 also includes a stationary shackle arm 86 affixed to the mounting portion 79 of the slide plate and lying between the two movable shackle arms 84. Each of the shackle arms 84 has a jaw portion 87 at its outer end adjacent the recessed outer end of the stationary shackle arm 86 for grasping the leg of a poult therebetween. Each of the shackle arms 84 also has an oblique camming ramp surface 88 for opening the shackles arms away from each other when the leg of a poult is moved against the ramp surface 88. Each of the shackles 70 also has a torsion spring 89 anchored on the slide plate and having the ends of the spring bearing against rear end portions 90 of the shackle arms for normally biasing the jaws 87 into closed position as illustrated. When the shackles are opened to release the leg of a poult, the shackle arms will assume the alternate position substantially as illustrated in FIG. 6.

Accordingly, it will be recognized that a poult may be manually lifted and manipulated into an inverted position, and then its legs may be inserted into the shackles 70 and the conveyer, including the motor 66, belts 67, and slide 68, will be moved along the frame bars 20, 21 to deliver the poult in inverted position to the waveguide 13 where its toes will be inserted through the apertures 55, 33.2.

As seen in FIG. 3, the transverse plate 27 has a pair of shackle opening cams 120 formed integrally thereof, and each of the shackle arms 84 has a cam follower pin 91 protruding from its upper side to engage and slide along a caming edge 120.1 of the cam 120. Accordingly, when the slide moves along the cams 120, the jaw arms 84 will separate as illustrated in FIG. 6 and the legs of the poult will be released, allowing the poult to drop off the shackle. After the poult has dropped from the shackle, the motor 66 will be reversed to return the slide to the front end of the machine as illustrated in FIGS. 3 and 4 for receiving another poult to be declawed.

The slide 68 is also provided with locking means, indicated in general by numeral 92, for locking the shackle arms 84 in closed position while the poult is being transported and supported at the waveguide 13 so that the shackles will not inadvertently release the poult prior to the end of the treatment. The shackle arm locking means includes a locking or retainer bar 93 (FIGS. 3, 4, 14) at the front end of the mounting portion 79 of the slide plate and traversing both shackles 70. The bar 93 is supported on a leaf spring 94 which lies along and is affixed to the stem portion 80 of the slide plate 77. The leaf spring 94 supports the locking bar 93 so that the recesses 95 in the upper portions of the locking bar 93 receive and retain the jaw arms 84 therein and restrain the jaw arms from moving outwardly and thereby restrain the jaw arms from releasing the poult's legs while the locking plate 93 is in raised or locking position.

In order to release the jaw arms for opening the shackles 70 for loading the legs of the poult onto the shackles and for releasing the legs from the shackles, means are provided for lowering the lock arm 93 at both the front end of the machine, adjacent header plate 22 where the shackles are being manually loaded, and at the rear end of the machine, adjacent plate 27 where the poult is being released. The mounting portion 79 of the slide plate 77 loosely carries a slide pin 96, the lower end of which protrudes through the slide plate and rests upon the mounting spring 94 for the locking bar 93.

A pair of camming ramps 97 and 98 are affixed on heater plate 22 and plate 27, respectively, of the frame 11 of the machine adjacent opposite ends of the path of movement of the slide 68 for engaging the pin 96 and pressing it downwardly as the slide moves along the frame bars 20, 21, which causes the locking plate 93 to be lowered to release the jaw arms 84.

Figure 14:
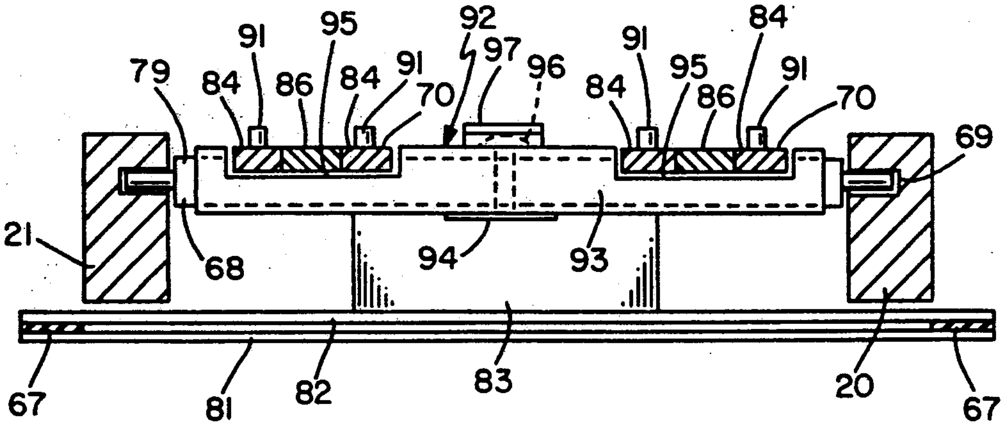
FIG. 14 is an enlarged detail section view taken approximately at 14-14 of FIG. 5.

As the slide 68 moves away from the extreme ends of its movement, the operating pin 96 will move away from the caming ramps 97, 98 and the locking plate will return to its locking position as seen in FIG. 14 under influence of leaf spring 94 to retain the jaw arms in closed position.

Figure 9:
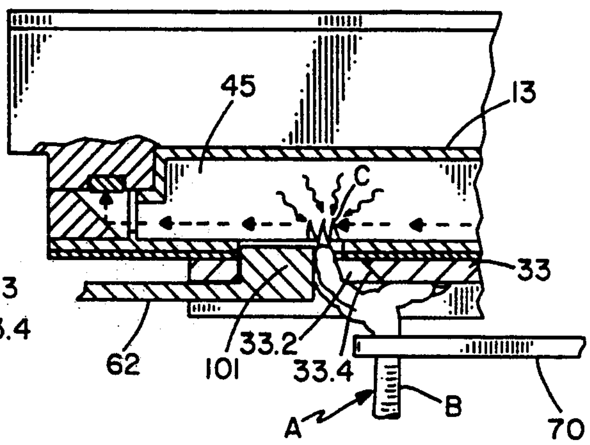
FIG. 9 is a detail section view of the waveguide taken generally at 9—9 of FIG. 5 with the toes of a poult in the slots of the waveguide.

When the toes of the poult are located at the apertures 55, 33.2, the claws and the ends of the toes are urged into the apertures and into the waveguide chamber 45 by the vacuum drawn on the waveguide chamber, and also by the closure plates 62 which swing from the position illustrated in FIG. 3 into the position illustrated in FIG. 9 as to at least partially close the apertures 55 and urge the three digits or toes of the poult into the apertures. The closure plates 62 are affixed to a rotatable cross member 99 which is carried and supported by a rotatable shaft 100 extending through bearing apertures in the mounting plates 30, 31.

Figure 11:
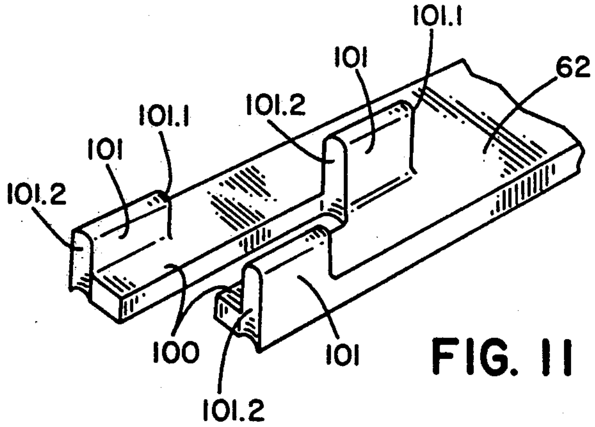
FIG. 11 is a detail perspective view of one of the closure plates for closing a set of apertures in the waveguide.

As best seen in FIGS. 6 and 11, the closure plates 62 are bifurcated to define a pair of spaced fingers 100, arranged so that their ends will substantially align with the apertures 55, 33.2 when the closure plates 62 are swung into confronting relation and flush against the bottom side of the mounting plate 33. The closure plates 62 have transversely projecting closure inserts or lugs 101 located in the same arrangement as the arrangement of the apertures 55, 33.2, so that the inserts or lugs 101 will be inserted into the apertures when the closure plate is swung into confronting and flush relation with the plate 33, substantially as illustrated in FIG. 9. The lugs 101 are preferably formed with one end 101.1 being convexly formed to fit snugly with a corresponding rounded end of the apertures 55, 33.2; and at the opposite end 101.2, each of the lugs is convexly shaped as to be rounded in conformity with the shape of the toe of the poult's foot which is inserted into the adjacent aperture. It will further be noted that the one end of the aperture 33.2 has an inclined or oblique end surface 33.4 to more nearly conform to the shape of the poult's toe when the toe is inserted into the aperture and into the waveguide chamber 45.

The closure plates 62 and the transverse mounting member 99 are operated by a pneumatic motor 102 which is mounted on the side plate 31 and is connected to the end of the shaft 100.1. The pneumatic motor, under the control of a suitable air valve operated by the controls of the machine, will be operated immediately after the toes of the poult are delivered to the apertures 55, 33.2. When the inserts or lugs 101 have been inserted into the apertures, and the closure plates 62 will lie flush against the plate 33, the final rotary movement of the shaft 100.1 will swing the operating arm 103, which is affixed on the end of shaft 100.1, against a microswitch 104, which is affixed on the side of mounting plate 30, so as to operate the microswitch. The effect of the operation of the microswitch 104 is to cause the control system to energize the magnetron 12 which will be operated for about one-half second to supply the necessary energy into the waveguide for producing the necessary veterinary treatment of the toes of the poult. As soon as the magnetron has completed its operation, the control system will again operate the pneumatic motor 102 and swing the closure plates 62 away from the apertures 55, 33.2, as to free the toes of the poult and allow the toes to be withdrawn from the apertures.

When the closure plates 62 have cleared the apertures 55, 33.2, the motor 66 will be operated again to move the slide, shackles and poult's feet so that the shackles will be opened by the cams 120, thereby releasing the poult from the shackles.

Another microswitch 105 affixed on a crossbar 106, which is a part of the frame, will confront one of the closure plates 62 in the rest position of the closure plate so that the microswitch 105 is operated when the closure plate has been returned to its full open or rest position. Operation of the microswitch 105 thereby operates the control system so that the motor 66 can again be operated for moving the poult away from the waveguide and to the releasing cams 120 for releasing the poult.

Figure 25:
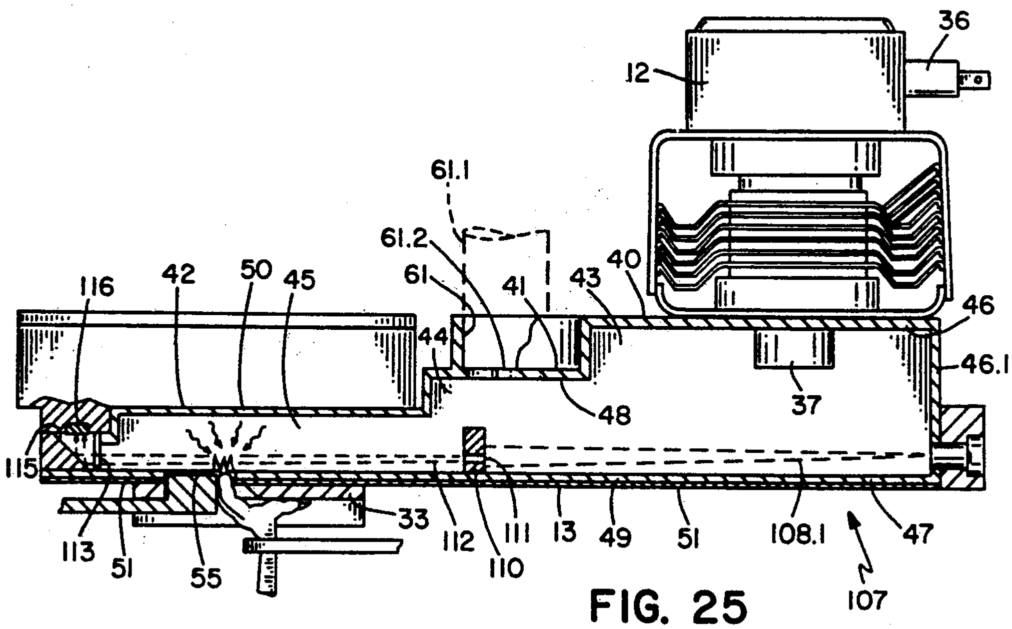
FIG. 25 is a detail section view through the wave guide and illustrating the infrared sensing for the poult's toes being exposed to microwave.
Figure 26:
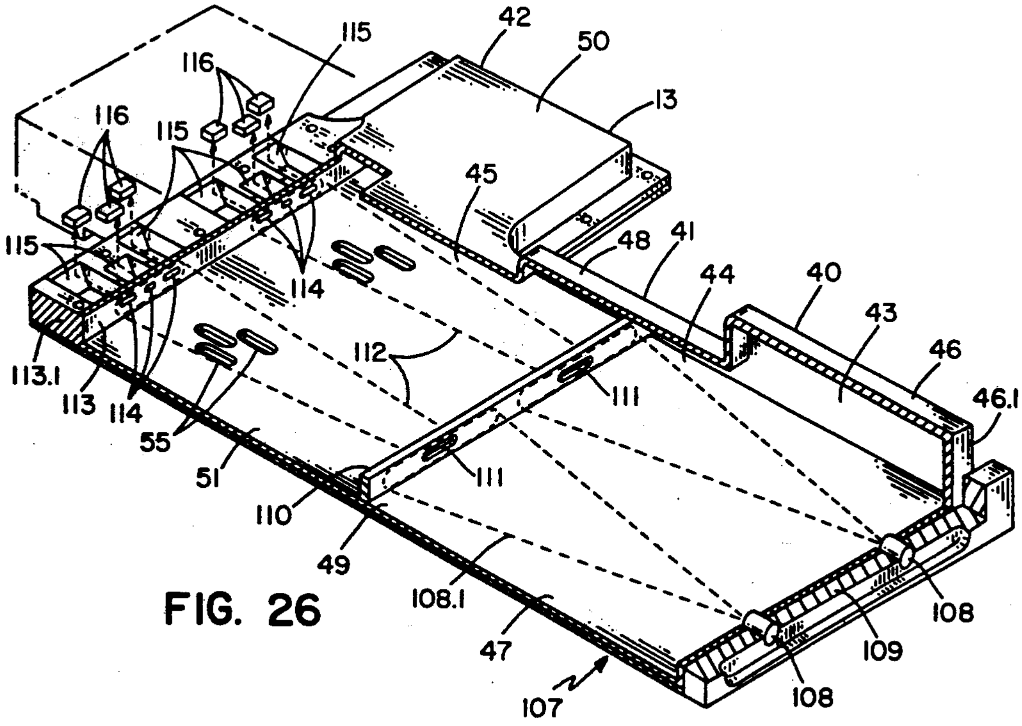
FIG. 26 is a diagrammatic perspective view of the wave guide and infrared sensing device.

The machine has an additional toe position sensing apparatus indicated in general by the numeral 107 and illustrated in FIGS. 25 and 26. The sensing apparatus 107 is associated with the control mechanism illustrated diagrammatically in FIG. 15 for the purpose of nearly optimizing the position of the toes in the waveguide 13 so as to best expose the toes to the microwave energy and kill a maximum of germinal bed tissue in each of the toes in order to effect the declawing of the toes. More specifically, a pair of infrared radiating devices 108, providing a source of infrared, are carried on a bracket 109 adjacent the rear wall 46.1 of the waveguide 13. The infrared radiators 108 protrude through apertures in the rear wall 46.1 and direct infrared lengthways through the waveguide in directional patterns indicated in FIGS. 25 and 26 by the numeral 108.1 and shown in dashed lines.

A fence or partial wall 110 traverses the intermediate chamber 44 of the waveguide and is of a material to be opaque to infrared, but transparent to microwaves from the magnetron 12 and its antenna 37.

The wall 110 has a pair of ports 111 therein and shaped to be oblong to pass infrared therethrough and to create directional radiation patterns 112 in chamber 45 of the waveguide adjacent the toe receiving apertures 55 in the bottom plate 51. The end wall 113 of the waveguide chamber 45 has two groups of apertures or windows 114 therein to pass infrared. Each of the windows 114 is directly in line with one of the windows 111 and one of the apertures 55 so that when a toe of the poult's foot protrudes upwardly through an aperture 55 as illustrated in FIG. 25, the claw or toe will interfere with the passage of infrared to a particular window and thereby reduce the amount of infrared which is received at the respective window 114.

Figure 15:
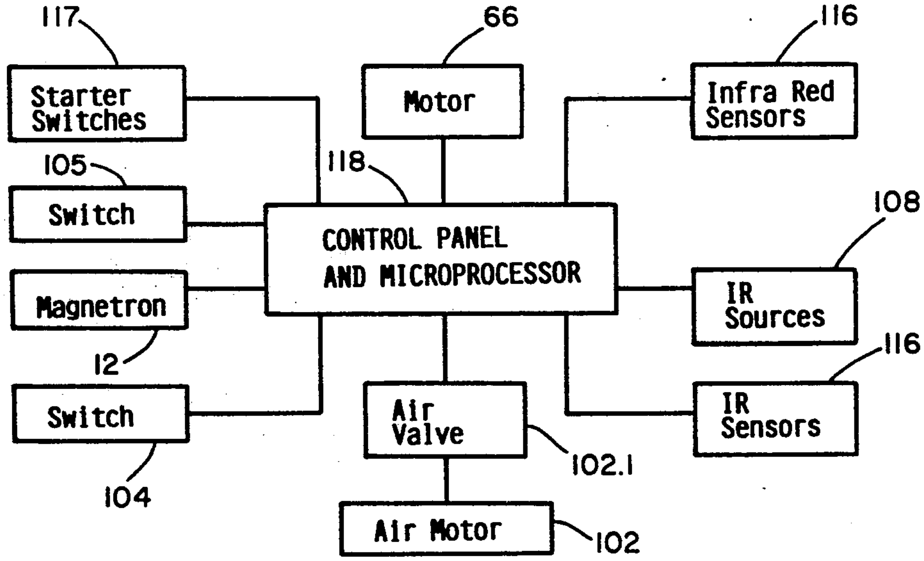
FIG. 15 is a diagrammatic illustration showing the control system of the present invention.

A multiplicity of reflective surfaces 115 are mounted in the end wall structure 113.1 of the waveguide 13, and the reflective surfaces 115 are oriented at an oblique angle relative to the direction of radiation of the infrared as to reflect the infrared upwardly into a multiplicity of infrared sensors 116. It will be recognized that there is an oblique reflective surface 115 and an infrared sensor 116 receiving the infrared passing through each of the respective windows 114; and accordingly, the sensors 116 will detect the radiation received across each of the apertures 55 and in the event that a toe or claw of the poult's foot protrudes through the aperture 55, the toe or claw will interfere with and reduce the amount of infrared which is received at the sensor 116. The output from the infrared sensor is directed into the control as indicated in FIG. 15, and as hereinafter more fully described.

Starter switches 117 are mounted on the upright frame panel 22 for energizing the control panel 118 as soon as the operator manually places the legs of the poult in the shackles 70.

The air motor 102 is controlled by air valve 102.1 which is in turn operated by the control panel 118.

Figure 2:
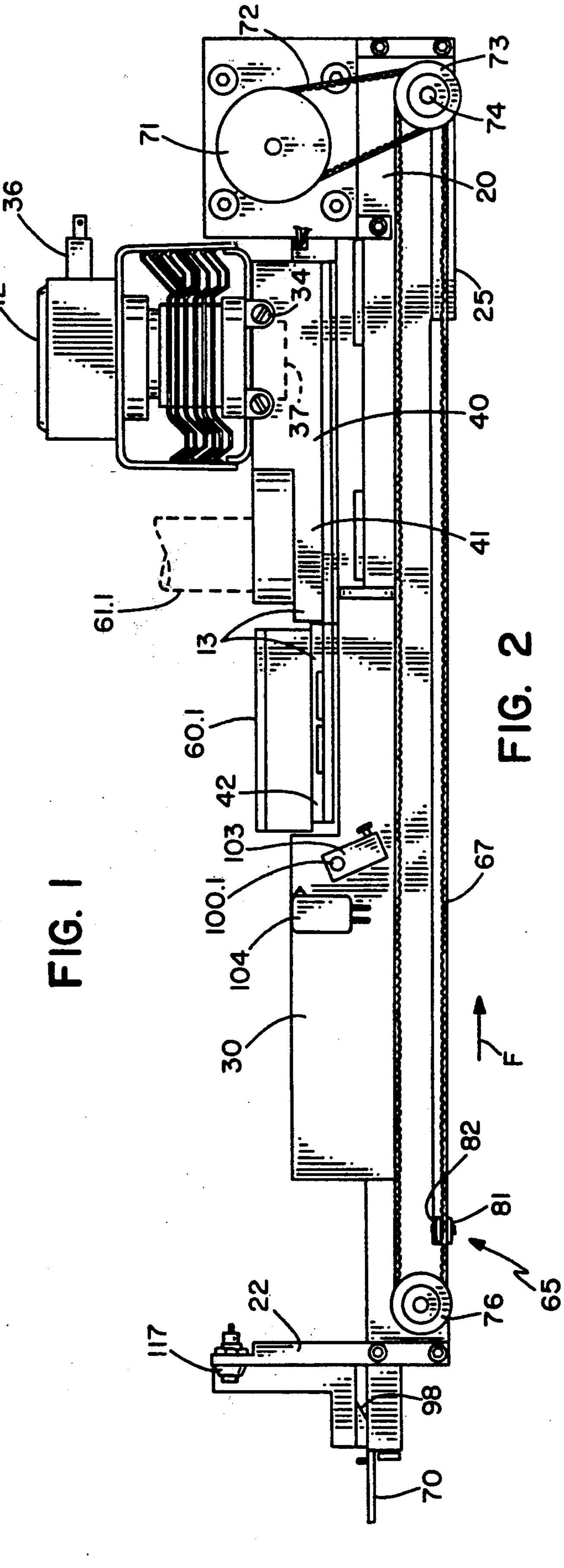
FIG. 2 is a side elevation view of the apparatus of FIG. 1.

A typical operational cycle of the declawing machine is as follows. A person will manually apply a poult to the declawing machine at a first station by inverting the poult and inserting its legs into the shackles or grasping means 70. As the poult is being applied to the shackles of the machine, the machine is in its standby mode wherein the stepping motor is not moving but is ready for operation; the magnetron is turned off, but the filament is on so that the magnetron is ready for operation; the infrared radiators 108 are on and radiating and the sensors 116 are receiving and sensing the infrared transmitted through the windows 111, 114 and reflected by the reflecting surfaces 115; the vacuum is being applied from the duct 61.1 so that the waveguide chamber is under vacuum pressure, causing air to be flowing inwardly through the apertures 55 into the waveguide; the microprocessor of the control panel is receiving signals from the infrared sensors or detectors 116 but is not reacting because the full amount of the infrared is being received; and the closure plates 62 are in their retracted position as illustrated in FIGS. 2, 4 and 6, and the microswitch 105 has been operated by the closure plates as to assure the control panel and the microprocessor 118 that the closure plates are in retracted and open position.

After the poult's legs have been inserted into the shackles 70, the starter switch 117 is operated, causing the control panel and microprocessor 118 to start the conveyor motor 66, whereupon the drive belts 67 will move the slide along the frame bars 20, 21. The poult's feet will move through the guiding groove 32.1 of guide plate 32 so that the poult's feet will be properly aligned as they approach the plate 33 and apertures 55, 33.2. The motor 66 is carefully controlled and continues operating until the conveyor transports the poult to the waveguide 13. As the poult's toes are guided into the groove 33.3 of plate 33, the individual toes will move into the apertures 33.2, 55, so that the claws C will protrude through the apertures 55 and into the chamber 45 of the waveguide. The stepping motor will stop at this moment, and the conveyor will also stop as the toes arrive at this second station adjacent apertures 33.2,55 so that the toes are in the approximately correct position for entry into the waveguide. As the toes confront the apertures 33.2, 55, the vacuum pressure in the waveguide chamber 45 and the air flowing inwardly through the apertures 33.2, 55, will assist in drawing the poult's toes and claws into the apertures and waveguide chamber. When the motor has stopped, the control panel and microprocessor operate the air valve 102.1 as to operate the air motor 102, thereby swinging the closure plates against the plate 33 and causing the inserts 101 to protrude into the apertures 33.2, 55 and also nudging the poult's toes into upright position, substantially as illustrated in FIG. 9.

When the poult's toes and claws have been so positioned as to protrude into the waveguide chamber 45, the infrared sensors 116 will provide indications to the control panel and microprocessor of the amount of infrared being radiated into the sensors 116. The control panel and microprocessor require that the amount of infrared received at each of the sensors 116 be approximately uniform, thus indicating all of the toes and claws of the poult are in approximately the same position in the microwave chamber.

In the event that there is disparity in the amount of infrared sensed among the several sensors 116, then the microprocessor 118 will again operate the air valve 102.1 to reverse the operation of motor 102 so as to swing the closure plates 62 away from the poult's toes and apertures 3.2, 55, and when the closures plates 62 have been reopened or swung out of the way, the stepping motor 66 is again operated by the control panel and microprocessor to minutely reverse the direction of operation of the motor and then oscillate the motor forward and back slightly several times so as to move the slide 68 back and forth a few times so that the poult's toes are moved slightly in the apertures 33.2, 55 in an attempt to reposition the poult's toes in the apertures and in the waveguide chamber 45. After the toes have been jostled in the apertures slightly, by the slide, the motor is again stopped, the closure plates 62 are swung into confronting relation with the poult's toes, and the infrared detectors again provide a signal to the control panel and microprocessor as to the relative uniformity of the infrared received at all of the sensors 116. If the sensors 116 have not shown uniformity of infrared received, then the toes will again be jostled slightly by back and forth movement of the motor and slide after the closure plates have been reopened, in another attempt to reposition the poult's toes.

After the positions of the poult's toes have been optimized, the magnetron is energized from its hot start mode with the filament already on and hot, for a set length of time, typically 500 milliseconds, plus or minus 300 milliseconds, and preferably always more than ¼ of a second, based on field experience, and after the set length of time, the magnetron is turned off again.

While the magnetron is on, the microwaves in the waveguide 13 produce a heating effect in the toes and claws of the poult which are being exposed to the microwaves in the waveguide chamber.

As soon as the magnetron has been turned off, by the control panel and microprocessor 118, the closure plates 62 are swung away from the poult's feet and into their retracted or home position as illustrated in FIGS. 3 and 6. Immediately the motor starts and the conveyor and slide 68 are started to draw the poult's toes out of the apertures 33.2, 55 and the slide proceeds toward the third station, i.e., the plate 27 and the unlocking cam 97. The passage by the slide under the cam 97 causes the locking bar 93 to be lowered away from the shackle arms 84 as to allow the shackle arms to be moved apart as the pins 91 thereon engage the camming edges 120.1 of the cams 120 on plate 27, thereby opening the shackles to release the poult at the third station and allow the poult to drop off the machine. Of course, the poult is retrieved immediately, not having been allowed to fall but only a few millimeters.

The motor 66 is then reversed, as to return the slide 68 and the shackles 70 to the front of the machine as illustrated in FIGS. 3 and 4 to have another poult applied to the shackles.

During the application of microwave energy to the poult's toes and claws, the microwave energy will kill at least some of the germinal bed tissue and in many cases will kill all of the germinal bed tissue of the poult's toes, although it is recognized that in some circumstances, not all of the germinal bed tissue may be killed. As previously stated, the killing of the germinal bed tissue of the claw will cause the claw to drop off after a period of time. Immediately after being subjected to the microwave energy, the claw will remain on the poult's foot while the poult is learning to walk and because the claw remains, the poult will walk on its feet in a normal way. There are no open wounds. By the time the claws fall off, the poult will be walking normally, without difficulty.

In the event that all of the germinal bed tissue is not killed, a small or deformed claw may ultimately be returned, but such a deformed claw is not considered dangerous in turkey poults as such a claw could be blunt and does not provide the poult with the ability to fight and injure other poults. It is pointed out that after the poult's toes and claws have been subjected to the microwave energy, there is essentially no recovery period required before the poult is eating its feed and drinking liquids in the normal way.

Figure 10:
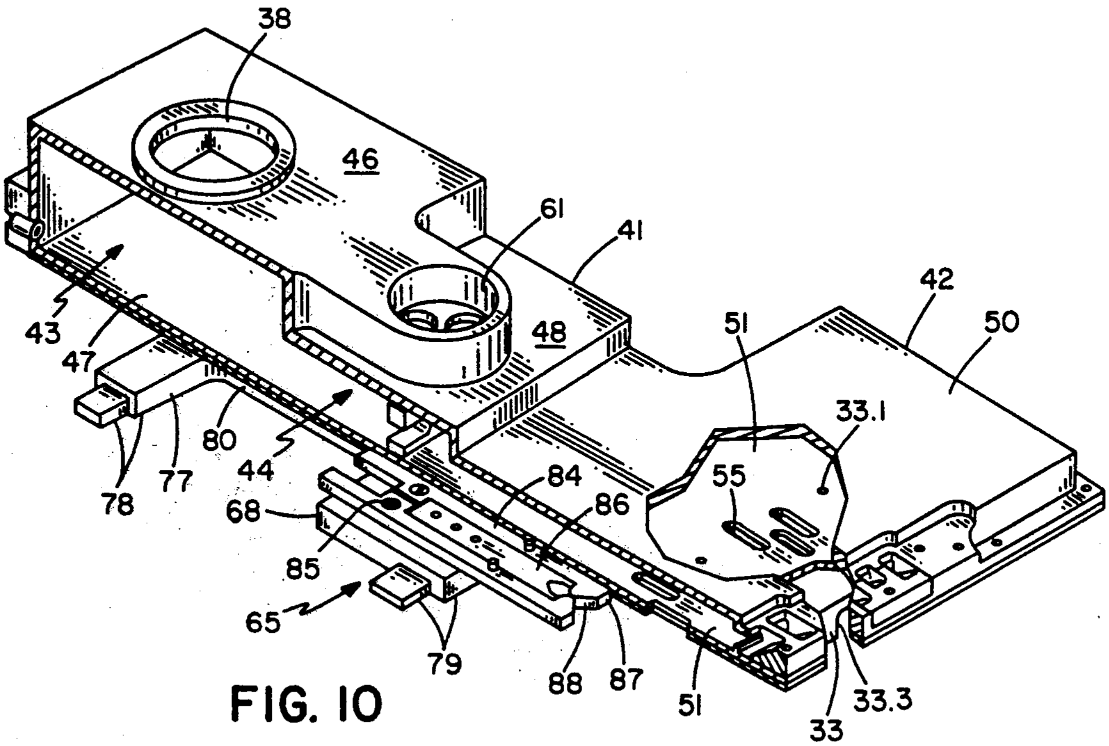
FIG. 10 is a detail perspective view of portions of the waveguide with certain portions broken away and shown in section for clarity of detail.
Figure 16:
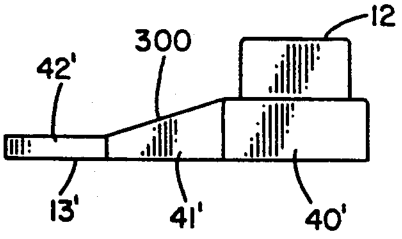
FIG. 16 is a diagrammatic view of an alternate embodiment of the microwave apparatus.

As shown in FIG. 16, an alternate form of waveguide 13' is shown wherein the step down portion 41' of the waveguide 13' may include an oblique upper panel 300 in lieu of horizontal panel 48 (see FIG. 10). However, such an oblique panel 300 is less preferred as it reflects a greater portion of microwaves back into box-like portion 40.

Figure 17:
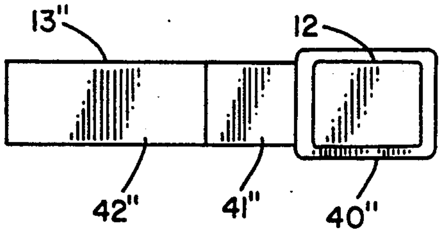
FIG. 17 is a diagrammatic view of another alternate embodiment of the microwave apparatus.

As shown in FIG. 17, another modified form of the waveguide 13'', the elongate box-like portion 42 may be set in line with other waveguide portions 40'', 41''. However, the preferred position of the elongate portion 42 is as shown in FIG. 1 and its related figures, where the elongate portion 42 is disposed at a right angle to waveguide portions 40, 41. Such a right angle orientation saves space.

Figure 18:
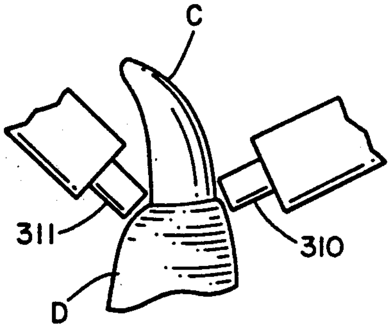
FIG. 18 is a diagrammatic illustration of a modified form of the invention.

As shown in FIG. 18, in an alternative method of generating heat to kill the germinal bed tissue from which the claw grows, electrical energy is applied to the toe of a one-day old poult. Typically, positive and negative leads 310, 311 are brought into contact with distal digital pad D and the claw C simultaneously. Approximately 200 volts of alternating current are applied for less than one second. With such resistive heating, the germinal bed tissue is killed and the claw C falls off in one to two weeks. Although the leads 310, 311 may be applied wholly to the claw C or the pad D, or one of the leads 310, 311 to the claw C and the other to the pad D, such application is less desired. Microwave heating is preferred over resistance heating.

Figure 19:
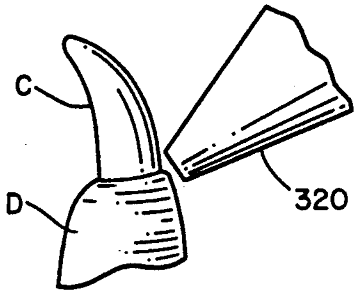
FIG. 19 is a diagrammatic illustration of another modified form of the invention.

As shown in FIG. 19, in another alternative method of generating heat to kill the germinal bed tissue from which the claw grows, ultrasound energy is applied. Typically, a single ultrasound probe 320 is brought into contact with both the distal pad D and the claw C of a one-day old poult for less than one second. Although less desired than the microwave heating, the ultrasound probe may be brought to bear upon the distal digital pad D or the claw C to kill the germinal bed tissue. The claw C and pad D are typically squeezed between the probe 320 and a block of wood or table top. Typically, the probe 320 is set to resonate in the range of 20–50 kHz with 40kHz being approximately the desired frequency. Such probes are typically used with ultrasonic welding equipment.

Figure 22:
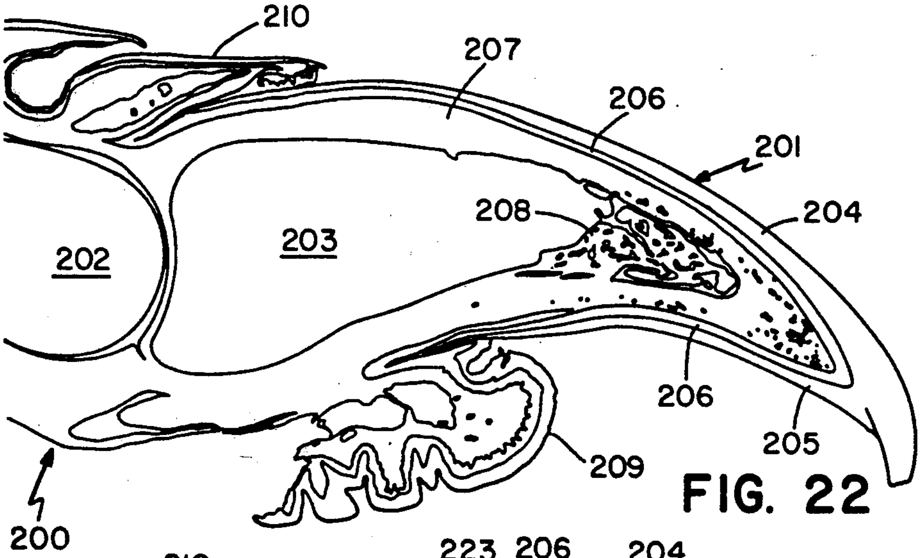
FIG. 22 is a diagrammatic illustration, in section, of the anatomy of an untreated toe portion of a one-day old poult.
Figure 23:
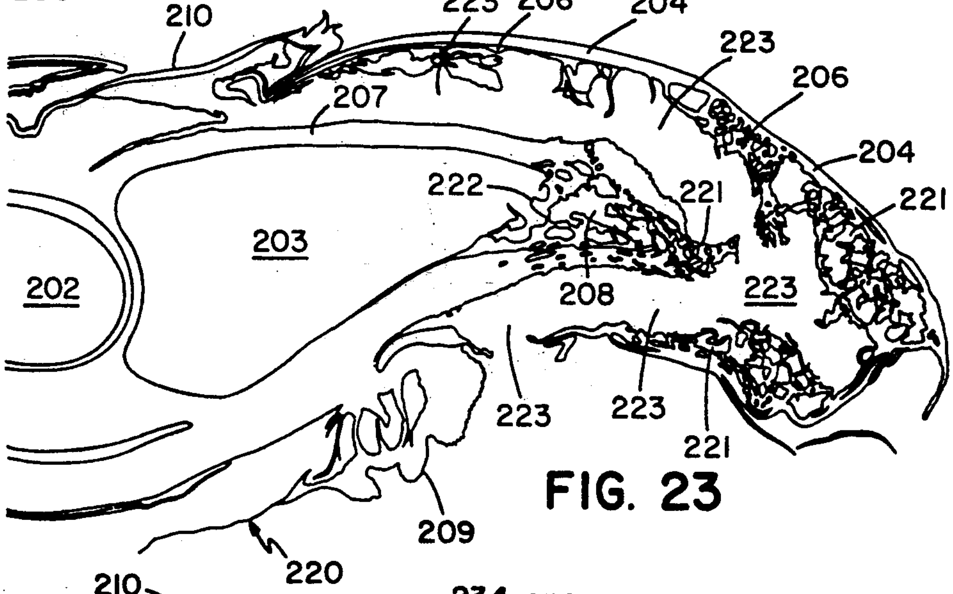
FIG. 23 is a diagrammatic view similar to FIG. 12, illustrating the toe portion about twenty minutes after being exposed to microwave energy.
Figure 24:
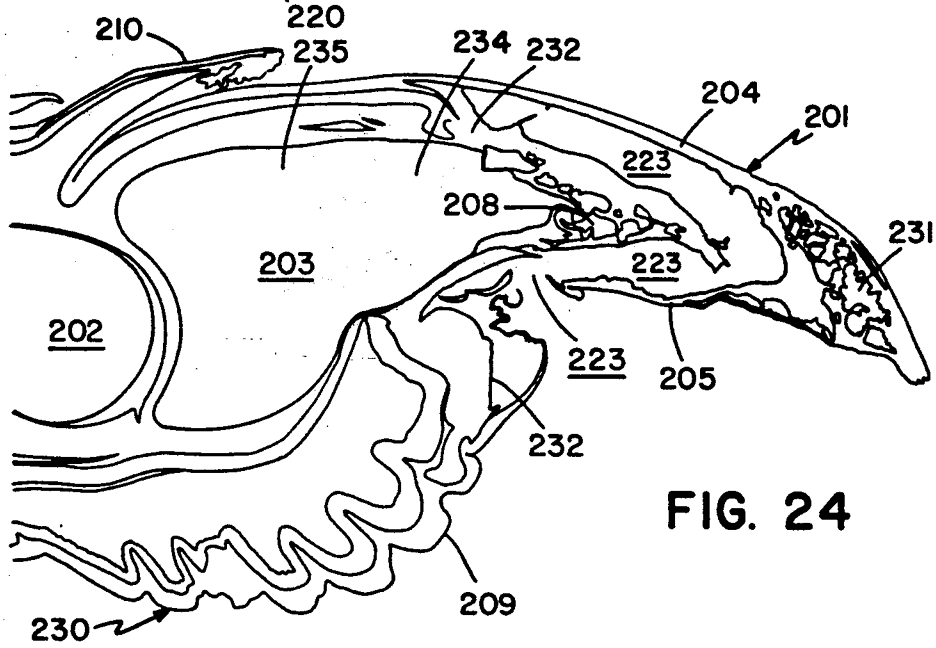
FIG. 24 is a diagrammatic view similar to FIG. 12, illustrating the toe portion approximately seven days after being exposed to microwave energy.

FIGS. 22, 23 and 24 are diagrammatic views showing the anatomy of a toe portion of a poult subjected to the treatment described. FIG. 22 illustrates an untreated toe portion 200 of a one-day old poult; FIG. 23 illustrates the same toe portion at approximately twenty minutes after being exposed to the microwave heating according to the present invention; and FIG. 24 illustrates the same toe portion at approximately seven days after the treatment with microwave energy. More specifically, the untreated toe portion 200 of FIG. 22 includes a claw or corneum or horn 201, a fourth phalanx or bone 202, and a fifth phalanx or bone 203. The claw 201 includes a dorsal plate 204 and a ventral plate 205. A horn germinating layer or horn-forming epithelium 206 lies immediately inside of the plates 204, 205. A dermis layer 207 lies between the horn germinating layer 206 and the fifth phalanx 203. A chondrocyte or cartilage forming area 208 extends from a distal portion of the fifth phalanx 203. The toe portion 200 also includes a terminal pad 209 and a terminal unguinal scale portion 210.

FIG. 23 illustrates a toe portion 220 twenty minutes after being exposed for approximately one-half second to microwaves. In the toe portion 220, there is a separation of the horn-forming epithelium 206 and its ligaments from the dermis 207 of the fifth phalanx. Vacuolated tissues and loss of cellular detail in regions 221 indicate coagulation necrosis. In a distal portion 222 of the fifth phalanx 203, the chondrocytes are hypereosinophilic and have lost cellular detail. This indicates necrosis of the distal portion of the third phalanx. The majority of the fifth phalanx 203 is intact. No tissue or horn is present in spaces designated by numerals 223.

FIG. 24 illustrates a toe portion 230 seven days after treatment with microwave energy. The dorsal plate 204 and central plate 205 of the horn 201 is degenerate. Much of the horn 201 is vacuolated as shown by reference numeral 231. A necrotic epithelium is found in regions 232. As in FIG. 23, no tissue or horn is present in spaces 223. Approximately a one-half portion 234 of the fifth phalanx is necrotic. The remaining one-half portion 235 of bone 203 is retained. The distal portion of the toe portion 230 falls off in one to two weeks following microwave treatment.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of processing live poults, comprising treating a portion of the germinal bed tissue of a toe with heat to at least partially inhibit growth of the claw from said tissue.

2. A method of processing live poults, comprising treating a portion of a toe with heat to at least partially inhibit growth of the claw from the toe.

3. A method of processing live poults, comprising exposing a portion of a toe to a heat media reactive with a portion of the germinal bed tissue to inhibit claw growth therefrom.

4. A method of processing live poults, comprising exposing a portion of a toe to a penetrating heat media reactive with a portion of the germinal bed tissue to inhibit claw growth therefrom.

5. A method of processing live poults, comprising treating a portion of a toe with heat to induce deterioration of a portion of the claw.

6. A method of processing live poults, comprising treating, without wounding, a portion of a toe with heat to induce deterioration of a portion of the claw.

7. A method of processing live poults, comprising exposing a portion of a toe to a heat media reactive with a portion of the toe to induce deterioration and separation of a portion of the claw from the toe.

8. A method of processing live poults, comprising killing a portion of the germinal bed tissue from which the claw grows with heat.

9. A method of processing live poults, comprising heating a portion of the poult's toe to kill a portion of the germinal bed tissue from which the claw grows.

10. A method of processing live poults, comprising heating of a portion of a poult's toe to cause at least a portion of the claw to fall away.

11. A method of processing live poults, comprising exposing a portion of a claw of the poult to microwave energy to at least partially inhibit growth of the claw.

12. A method of processing live poults, comprising exposing a portion of the claw and a portion of the germinal bed tissue from which the claw grows, the microwave energy to at least partially inhibit growth of the claw.

13. A method of processing live poults, comprising embracing a portion of the claw and a portion of the toe from which the claw grows, with microwave energy to at least partially inhibit growth of the claw.

14. The method of processing live poults according to claim 13 wherein portions of three toes of one foot and portions of the claws thereon are simultaneously embraced with microwave energy.

15. The method of processing live poults according to claim 13 wherein other portions of the toe are shielded from the microwave energy.

16. The method of processing live poults according to claim 12 wherein said claw is inserted into a waveguide portion, and directing microwave energy into said waveguide portion for heating the claw of the poult.

17. The method of processing live poults according to claim 3 wherein the poult is suspended from its legs in an inverted position with the head of the poult hanging downward while the claw of the poult is exposed to microwave energy.

18. The method of processing live poults according to claim 10 wherein the heating is provided by applying microwave energy to at least a portion of the claw.

19. The method of processing live poults according to claim 10 wherein the heating is provided by applying ultrasound energy to at least a portion of the claw.

20. The method of processing live poults according to claim 10 wherein the heating is provided by applying electrical energy to at least a portion of the claw.

21. A method of processing live poults, the poults having claws on their toes, the method comprising the step of removing at least a portion of a claw from one of the toes with heat.

22. A method of processing live poults, the poults having claws which grow from germinal bed tissue, the method comprising the step of declawing the poults by killing a portion of the germinal bed tissue from which the claw grows.

23. A method of processing live poults according to claim 22 wherein the toe of the poult is left substantially intact.

24. A method of preparing live poults for treatments comprising suspending the poult in an inverted position with the head of the poult hanging downwardly to quiet the poult to render the poult easier to treat, a claw of the poult being exposed to microwave energy while the poult is suspended in the inverted position to at least partially inhibit growth of the claw.

25. In the art of handling a live poult for veterinary treatment, the method comprising the step of suspending the poult from its legs in an inverted position to quiet the poult to render the poult easier to treat, the method further comprising the step of exposing a claw of the poult to microwave energy to at least partially inhibit growth of the claw.

26. Declawing apparatus for applying microwave energy onto the toes and claws of a live poult, comprising:

a waveguide portion to which microwave energy is supplied, the waveguide portion comprising a closed chamber into which microwaves are emanated, the waveguide portion having a wall portion with a plurality of apertures therein through which toes of the poult extend for locating the claws in the chamber.

27. Declawing apparatus according to claim 26 wherein a source of partial vacuum pressure is connected to the waveguide portion for drawing the toes of the poult into the waveguide portion.

28. Declawing apparatus according to claim 26 wherein certain of said apertures are elongate slot shaped, and an insert portion removably contained in a portion of one of said apertures for positioning the toe in the waveguide portion and shielding the other portions of the toe from the microwave energy.

29. Declawing apparatus according to claim 26 wherein shackle portions are removably attached to the poult's legs and position the toes adjacent the waveguide portion.

30. Declawing apparatus according to claim 26 wherein said wall portion is below said chamber, and shackle portions being removably attached to the poult's legs below said wall portion and positioning the toes for insertion upwardly into the apertures while the poult is suspended in inverted position from the shackle portions.

31. Declawing apparatus according to claim 26, wherein a grasping means attachable to the legs of a poult is adjacent said waveguide portion for locating the toes of the poult adjacent the apertures of said wall portion.

32. Declawing apparatus according to claim 26 wherein grasping means attachable to the legs of a poult is located adjacent said waveguide portion, and a conveyer portion between said waveguide portion and said grasping means produces relative movement between said waveguide portion and grasping means for locating the toes at said apertures.

33. Declawing apparatus according to claim 26 wherein an infrared source directs infrared radiation along said wall portion and across said apertures therein, and an infrared sensing portion sensing the infrared traversing one of said apertures to determine the presence of the poult's toe and claw protruding through the aperture.

34. Declawing apparatus according to claim 33 wherein multiple sensing portions sense the infrared traversing the several apertures to determine the presence of all of the poult's toes and claws protruding through the apertures.

35. Declawing apparatus according to claim 33 and reversible conveyor means delivering a poult and its feet to said apertures, and means controlling the conveyor means to adjust the location of the poult's feet relative to said apertures to nearly optimize the protruding of the claws into the waveguide.

36. Declawing apparatus for processing live poults in the removal of claws, comprising:

grasping means for suspending a poult in inverted position from its legs, and microwave apparatus adjacent to the grasping means and comprising a waveguide portion comprising a panel portion with apertures therein receiving the toes and claws of the inverted poult, the waveguide portion also comprising a chamber adjacent said panel portion into which the toes and claws extend for exposure to the microwave energy.

37. Declawing apparatus according to claim 36 and manipulating means producing movement of the toes and claws into the chamber.

38. Declawing apparatus according to claim 37 wherein said manipulating means comprises a source of vacuum air pressure connected into said chamber and causing the claws and toes to be drawn through the apertures.

39. Declawing apparatus according to claim 37 wherein said manipulating means comprises a conveyor portion connected with the grasping means and moving the toes to said apertures.

40. Apparatus for processing a live poult comprising:

grasping means removably attachable to the legs of the poult and suspending the poult in inverted position to quiet the poult to render the poult easier to treat, and treating means performing a veterinary treatment of one of the toes of the poult while the poult is suspended in inverted position.

41. Apparatus for processing a live poult according to claim 40 wherein a conveyer portion carries said grasping means from a first station wherein said grasping means are applied to the legs of the poult and to a second station wherein the veterinary treatment is performed.

42. Apparatus for processing a live poult according to claim 41 and said conveyer portion also conveying the poult to a third station, said third station comprising a releasing device engaging said grasping means and releasing the legs of the poult from said grasping means.

43. Apparatus for processing a live poult according to claim 40 wherein said grasping means comprises a shackle portion with a movable jaw portion openable and closable to receive and grasp a leg of the poult, the jaw portion having an oblique ramp surface against which a leg of the poult may be moved for moving the jaw to open position for insertion of the leg into the shackle portion.

44. Apparatus for processing a live poult according to claim 40 wherein said grasping means comprises a shackle portion with a movable jaw portion for opening and closing the shackle portion for receiving and grasping a leg of the poult, a conveyer portion carring said grasping means to a first station wherein said veterinary treatment is performed, and carrying said grasping means to a second station, said second station comprising a releasing portion to open said jaw portion and release the leg of the poult from the shackle portion.

45. A microwave apparatus for de-clawing a live poult by the application of microwave energy onto at least one claw of the poult, the microwave apparatus comprising:

a frame assembly, a magnetron on the frame assembly for generating microwaves, a waveguide portion on the frame assembly and into which microwaves are supplied, the waveguide portion comprising a closed chamber into which microwaves are emanated and also comprising a wall portion with at least one aperture therein through which the claw of the poult extends for locating the claw in the chamber, and sensing means adjacent the waveguide for locating v, the position of the claw relative to the waveguide to determine whether the claw is sufficiently positioned for treatment with microwaves.

46. The microwave apparatus according to claim 45 wherein the sensing means comprises infrared sensors.

47. The microwave apparatus according to claim 45 wherein at least a portion of the sensing means is disposed in the chamber.

48. A microwave apparatus for de-clawing a live poult by the application of microwave energy onto at least one claw of the poult, the microwave apparatus comprising:

a frame assembly, a magnetron on the frame assembly for generating microwaves, a waveguide on the assembly end to which microwaves are supplied, the waveguide comprising a closed chamber into which microwaves are emanated, a portion of the waveguide having a wall portion with at least one aperture therein through which the claw of the poult extends for locating the claw in the chamber, conveying means on the frame assembly for moving the poult and claw to the waveguide, the conveying means comprising a grasping means for grasping the poult, a source of vacuum air pressure connected into the chamber and causing the claw to be drawn through the aperture, and sensing means adjacent the waveguide for sensing the position of the claw relative to the waveguide.

49. In the art of processing live poults, the method of inhibiting the growth of a claw of a live poult, the claw having germinal bed tissue, the method comprising the step of treating a portion of the claw with a penetrating media which is reactive with said germinal bed tissue of the claw to inhibit growth of the claw of the live poult.

* * * * *

UNITED STATES PATENT AND TRADEMARK OFFICE
CERTIFICATE OF CORRECTION

PATENT NO. : 5,195,925

DATED : March 23, 1993

INVENTOR(S) : Marc S. Gorans

It is certified that error appears in the above-identified patent and that said Letters Patent is hereby corrected as shown below:

In column 11, line 21, delete "3.2" and insert --33.2--.

In column 14, line 31, delete the second "the" and insert --to--.

In column 17, line 19, after "locating" delete --v,--.

Signed and Sealed this

Fourteenth Day of December, 1993

Attest:

BRUCE LEHMAN

*Attesting Officer*

*Commissioner of Patents and Trademarks*